US012012870B1

(12) United States Patent
Rogers et al.

(10) Patent No.: US 12,012,870 B1
(45) Date of Patent: Jun. 18, 2024

(54) MACHINABLE COATING FOR CMC AND METAL INTERFACE IN A TURBINE SECTION

(71) Applicant: Raytheon Technologies Corporation, Farmington, CT (US)

(72) Inventors: Daniel S. Rogers, Lyman, ME (US); Robert A. White, III, Meriden, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/071,060

(22) Filed: Nov. 29, 2022

(51) Int. Cl.
*F01D 5/28* (2006.01)
*F01D 5/14* (2006.01)
*F01D 5/30* (2006.01)

(52) U.S. Cl.
CPC ............. *F01D 5/288* (2013.01); *F01D 5/147* (2013.01); *F01D 5/3007* (2013.01); *F05D 2220/323* (2013.01); *F05D 2230/31* (2013.01); *F05D 2240/30* (2013.01)

(58) Field of Classification Search
CPC ..... F01D 5/3007; F01D 5/3084; F01D 5/3092
See application file for complete search history.

(56) References Cited

U.S. PATENT DOCUMENTS 2,667,327 A * 1/1954 Hardigg .................. F01D 5/323 29/513
4,820,126 A * 4/1989 Gavilan ................ F01D 5/3092 416/221
7,666,515 B2 * 2/2010 Nagaraj ................ C23C 28/345 416/241 B
7,963,745 B1 * 6/2011 Liang ...................... F01D 5/187 416/224
9,777,583 B2 * 10/2017 Leggett ................... C23C 10/02
10,024,175 B2 7/2018 Varney
10,280,770 B2 5/2019 Shim et al.
10,401,028 B2 9/2019 Freeman et al.
10,415,402 B2 * 9/2019 Murdock .............. F01D 5/3092
10,458,653 B2 10/2019 Freeman et al.
(Continued)

FOREIGN PATENT DOCUMENTS

EP 1564377 B1 4/2010
JP H1130103 A * 2/1999

OTHER PUBLICATIONS

European Search Report for EP Application No. 23212422.2 dated Apr. 8, 2024.

*Primary Examiner* — Courtney D Heinle
*Assistant Examiner* — Danielle M. Christensen
(74) *Attorney, Agent, or Firm* — Carlson, Gaskey & Olds, P.C.

(57) ABSTRACT

A gas turbine engine turbine blade includes a turbine blade body including an inner platform. An airfoil extends radially outwardly of the inner platform. The airfoil has a leading edge and a trailing edge, and a suction wall and a pressure wall. The turbine blade body has mount structure including at least one circumferentially outwardly extending mount portion on a suction wall side and a pressure wall side each having a radially outer face. The turbine blade body is formed of one of a polymer, metal or ceramic matrix composite. There is a protective coating on the radially outer faces of the at least one enlarged mount portions. A gas turbine engine is also disclosed.

16 Claims, 5 Drawing Sheets

(56) References Cited

U.S. PATENT DOCUMENTS

| | | | | |
|---|---|---|---|---|
| 10,465,534 | B2 | 11/2019 | Freeman et al. | |
| 10,472,976 | B2 | 11/2019 | Freeman et al. | |
| 10,760,435 | B2 * | 9/2020 | Dawson | F01D 5/18 |
| 11,143,040 | B2 | 10/2021 | McCaffrey et al. | |
| 2007/0253822 | A1 | 11/2007 | Buisson et al. | |
| 2013/0017059 | A1 * | 1/2013 | Wu | F01D 5/082 415/115 |
| 2015/0050158 | A1 * | 2/2015 | Thomas | F01D 5/3092 156/60 |
| 2017/0218768 | A1 * | 8/2017 | Boeck | F01D 5/3092 |
| 2020/0149426 | A1 | 5/2020 | Strock | |
| 2021/0246791 | A1 | 8/2021 | McCaffrey | |
| 2022/0169574 | A1 | 6/2022 | Shim et al. | |

* cited by examiner

MACHINABLE COATING FOR CMC AND METAL INTERFACE IN A TURBINE SECTION

BACKGROUND OF THE INVENTION

This application relates to a mount structure and turbine blade for use in a gas turbine engine turbine section.

Gas turbine engines are known, and typically include a fan delivering air into a bypass duct as propulsion air. The fan also delivers air into a compressor. Compressed air is delivered downstream to a combustor where it is mixed with fuel and ignited. Products of this combustion pass downstream over turbine rotors, driving them to rotate. The turbine rotors in turn rotate fan and compressor rotors.

As can be appreciated, the turbine section sees very high temperatures from the products of combustion. Thus, a good deal of effort is expended in trying to provide turbine components that can survive the high temperatures.

One recent design for providing turbine section components is the use of ceramic matrix composites ("CMCs"). It has been proposed to form a turbine blade from CMCs.

SUMMARY OF THE INVENTION

In a featured embodiment, a gas turbine engine turbine blade includes a turbine blade body including an inner platform. An airfoil extends radially outwardly of the inner platform. The airfoil has a leading edge and a trailing edge, and a suction wall and a pressure wall. The turbine blade body has mount structure including at least one circumferentially outwardly extending mount portion on a suction wall side and a pressure wall side each having a radially outer face. The turbine blade body is formed of one of a polymer, metal or ceramic matrix composite. There is a protective coating on the radially outer faces of the at least one enlarged mount portions.

In another embodiment according to the previous embodiment, there are two radially spaced ones of the mount portion of each of the suction wall side and the pressure wall side. Each of the mount portions have the coating on the radially outer face.

In another embodiment according to any of the previous embodiments, one of two axial ends of at least one of the mount portions also receives the protective coating.

In another embodiment according to any of the previous embodiments, the protective coating is on the one axial end of both of the mount portions.

In another embodiment according to any of the previous embodiments, the coating is also on an opposed one of the axial ends of at least one of the enlarged mount portions.

In another embodiment according to any of the previous embodiments, one of two axial ends of the at least one mount portion also receives the protective coating.

In another embodiment according to any of the previous embodiments, the coating is also on an opposed one of the axial ends of at least one of the enlarged mount portion.

In another embodiment according to any of the previous embodiments, there are uncoated portions radially inward and radially outward of the radially outer faces of the at least one mount portion, and uncoated portions radially inward and radially outward of the protective coating on the at least one of the axial ends.

In another featured embodiment, a gas turbine engine includes a compressor section, a combustor section and a turbine section. The turbine section includes a shaft rotating with a turbine disk. The turbine disk has a plurality of slots and the turbine disk is formed of a metal. Turbine blades are received within each of the slots. The turbine blades include an inner platform. An airfoil extends radially outwardly of the inner platform. The airfoil has a leading edge and a trailing edge, and a suction wall side and a pressure wall side, and mount structure including at least one circumferentially outwardly extending mount portions each having a radially outer face. The turbine blade is formed of one of a polymer, metal or ceramic matrix composite. There is a protective coating on the radially outer faces of the at least one enlarged mount portions. In another embodiment according to any of the previous embodiments, there are two radially spaced ones of the mount portions on each of the suction wall side and the pressure wall side, and each of the mount portions having the coating on the radially outer face.

In another embodiment according to any of the previous embodiments, one of two axial ends of at least one of the mount portions also receives the protective coating, and a mount features secures the blades in the disk and contacts the mount portion at a location on the axial end receiving the coating.

In another embodiment according to any of the previous embodiments, the protective coating is formed on the one axial end of both of two enlarged mount portions, and the mount feature is a cover plate formed of a metal and secured to the disk.

In another embodiment according to any of the previous embodiments, the coating is also on an opposed one of the axial ends of at least one of the enlarged mount portions. There is a mini-disk fixed to the shaft, and in contact with the mount structure on the turbine blades, with the mini-disk formed of a metal and contacting the blade at a location on the opposed axial end, and the location receiving the coating.

In another embodiment according to any of the previous embodiments, the coating is also on an opposed one of the axial ends of at least one of the enlarged mount portions. There is a mini-disk fixed to the shaft, and in contact with the mount structure on the turbine blades, with the mini-disk formed of a metal and contacting the blade at a location on the opposed axial end, and the location receiving the coating.

In another embodiment according to any of the previous embodiments, one of two axial ends of at least one of the mount portions also receives the protective coating, and a mount features secures the blades in the disk and contacts the mount portion at a location on the axial end receiving the coating.

In another embodiment according to any of the previous embodiments, the coating is also on an opposed one of the axial ends of at least one of the enlarged mount portions. There is a mini-disk fixed to the shaft, and in contact with the mount structure on the turbine blades, with the mini-disk formed of a metal and contacting the blade at a location on the opposed axial end, and the location receiving the coating.

In another featured embodiment, a gas turbine engine turbine blade includes a turbine blade body including an inner platform. An airfoil extends radially outward of the inner platform. The airfoil has a leading edge and a trailing edge, and a suction wall and a pressure wall. The turbine blade body has mount structure including at least one circumferentially outwardly extending mount portion on a suction wall side and a pressure wall side. Each have a radially outer face and a pair of opposed axial ends. The turbine blade body is formed of one of a polymer, metal or ceramic matrix composite. There is a protective coating on the at least one mount portion at at least one of the axial ends.

In another embodiment according to any of the previous embodiments, the coating is also on an opposed one of the axial ends of at least one of the mount portion.

In another embodiment according to any of the previous embodiments, there are uncoated portions radially inward and radially outward of the protective coating on each of the axial ends.

In another embodiment according to any of the previous embodiments, there are uncoated portions radially inward and radially outward of the protective coating on at least one of the axial ends.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
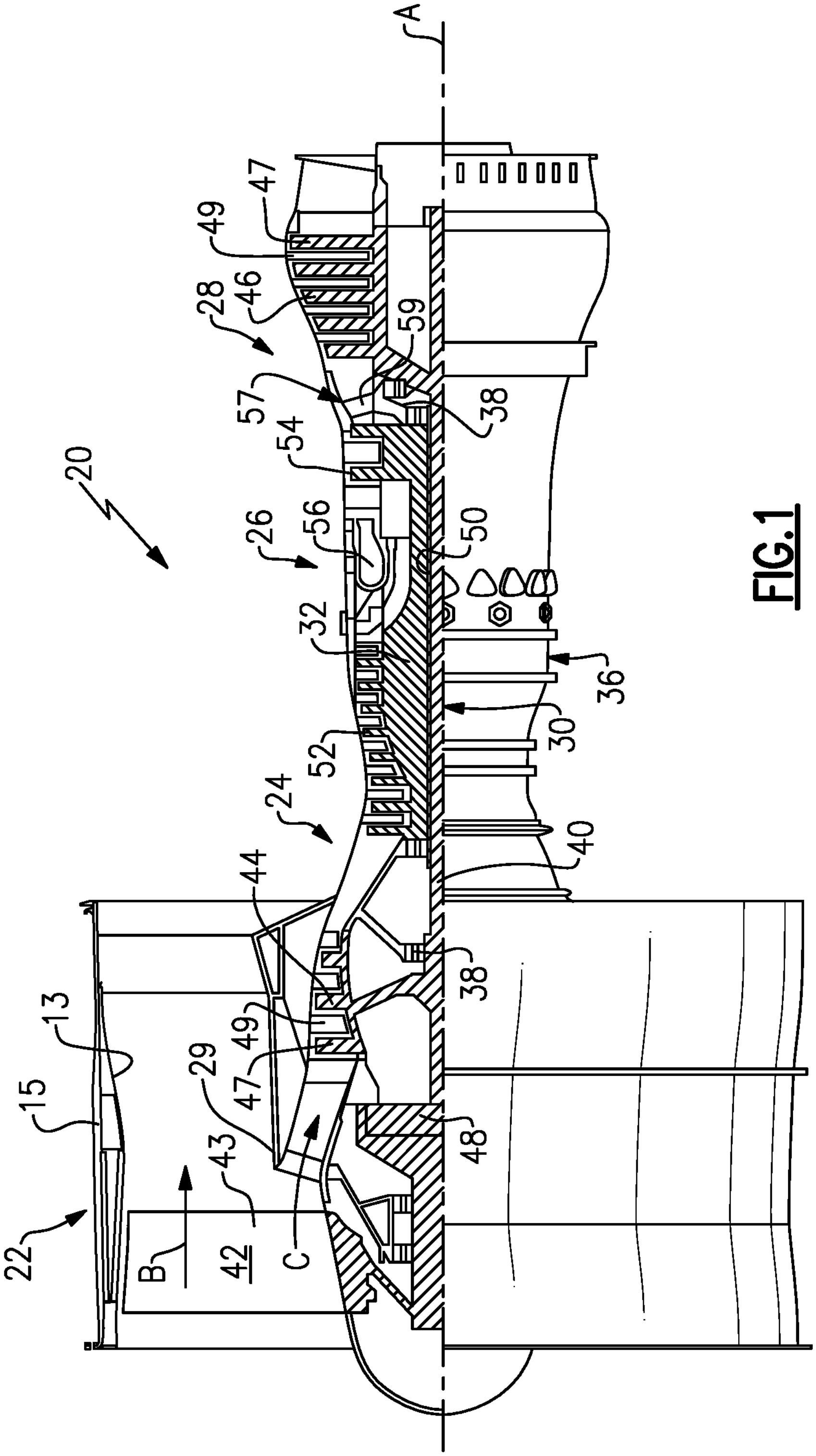
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram}° \text{R})/(518.7° \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2B:
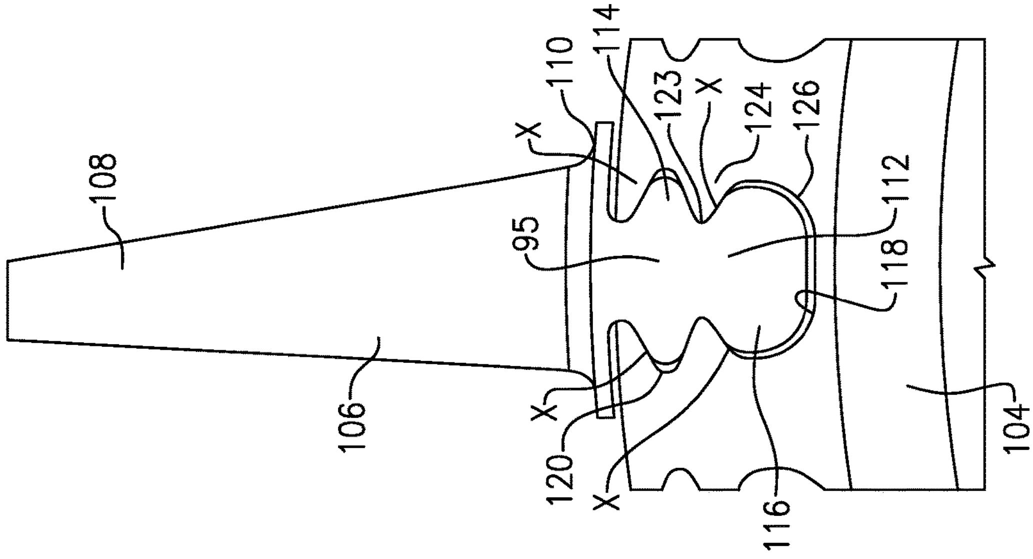
FIG. 2B is a cross-sectional view taken along line B-B of FIG. 2A.
Figure 2A:
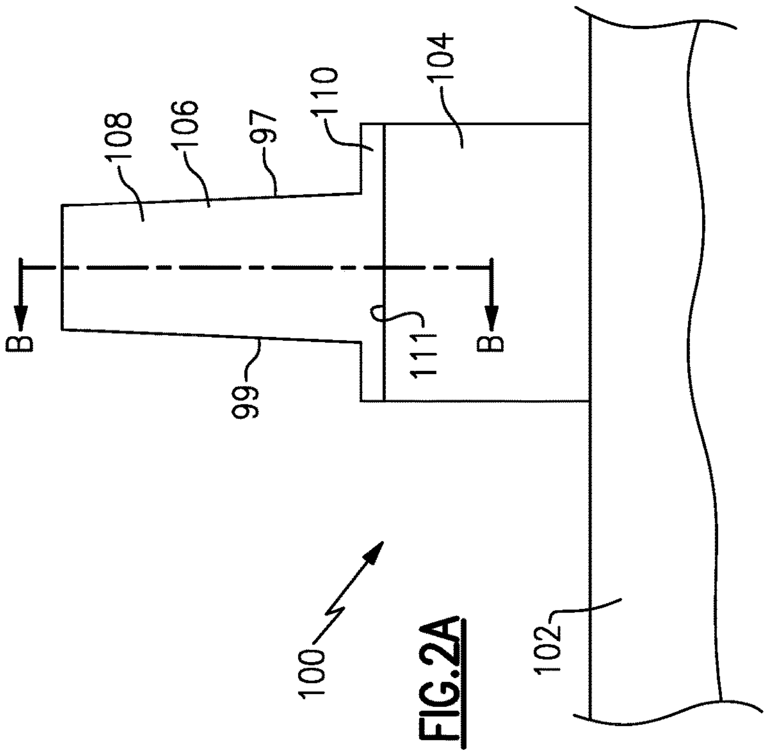
FIG. 2A shows a portion of the turbine section in a highly schematic manner.

FIG. 2A shows a portion of a turbine section 100 such as may be utilized in the gas turbine engine shown in FIG. 1. It should be appreciated that FIG. 2A is highly schematic. A shaft 102 drives a rotor disk 104. A plurality of turbine blades 106 are mounted in the disk 104. The turbine blades 106 have an airfoil 108 with a leading edge 99 and a trailing edge 97. The blade 106 also has an inner platform 110 that sits on a radially outer surface 111 of the disk 104.

FIG. 2B is a cross-sectional view through a portion of FIG. 2A. As can be seen, the disk 104 has a groove 118 receiving mount structure 95 from the blade 106. The mount structure 95 here is a so called "fir-tree" mount. There are circumferentially enlarged mount portions 114 and 116 in the fir-tree mount received in groove portions 120 and 126. There is an intermediate thinner portion 123 on the mount structure 95 and between the enlarged portions 114 and 116. A tab 124 of the disk fits into the thinner portion 123.

Figure 2C:
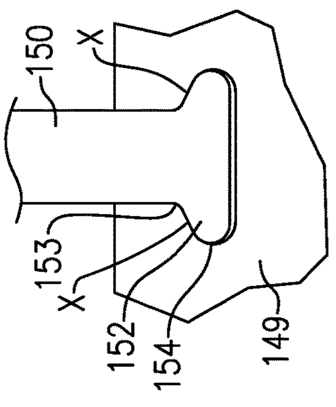
FIG. 2C shows an alternative turbine blade mount.

FIG. 2C shows an alternative blade 150 having a so called "dovetail" mount having enlarged portion 152 in a groove 154 in a rotor disk 149. Enlarged portion 152 extends circumferentially outwardly of a thinner portion 153.

In either such arrangement, there is an area of contact at X radially outward of each of the enlarged mount portions 114/116/152. Under centrifugal force these are areas of high vibration and frictional contact.

The blades 106/150 are formed of a composite material such as a polymer matrix composite ("PMC"), metal matrix composite ("MMC"), ceramic matrix composite ("CMC"), or a monolithic ceramic. In specific, a CMC material may be comprised of one or more ceramic fiber plies in a ceramic matrix. Example of ceramic matrices are silicon-containing ceramics, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows/yarns relative to one another, such as a 2D/3D weave, braid, knit, or a nonwoven structure. A monolithic ceramic does not contain fibers or reinforcement and is comprised of a single material. Example monolithic ceramics include silicon-containing ceramics, such as silicon carbide (SiC) or silicon nitride (Si3N4).

The disks 104 and 149 are typically formed of a metal. In particular nickel, cobalt, nickel alloy, or cobalt alloy may be used. Thus, the areas X are an interface between CMC materials and metallic materials. Vibration at these areas may cause wear. Moreover, due to the distinct materials and in combination with the wear there may be unwanted chemical reaction or heat transfer between the parts.

The areas X may also serve to as face seals to prevent cooling flow sent to the blade from escaping into the gaspath. As such, it is crucial to have high sealing effectiveness at these interfaces.

CMCs typically do not undergo elastic strain as readily as their metallic counterparts due to their generally higher elastic moduli, and as a result, dovetail configurations are often employed since the multi-teeth contact zones present in fir-tree configurations often rely on elastic deformation of the blade attachment teeth in order to help distribute the load into each of the individual teeth. To make fir-tree attachments more suitable for CMC blades, a more compliant member is needed.

Reducing the blade attachment manufacturing surface variation is also key in ensuring a tight fit to the mating disk features which will preserve design intent and limit any anticipated variation in loading between the components.

Figure 3B:
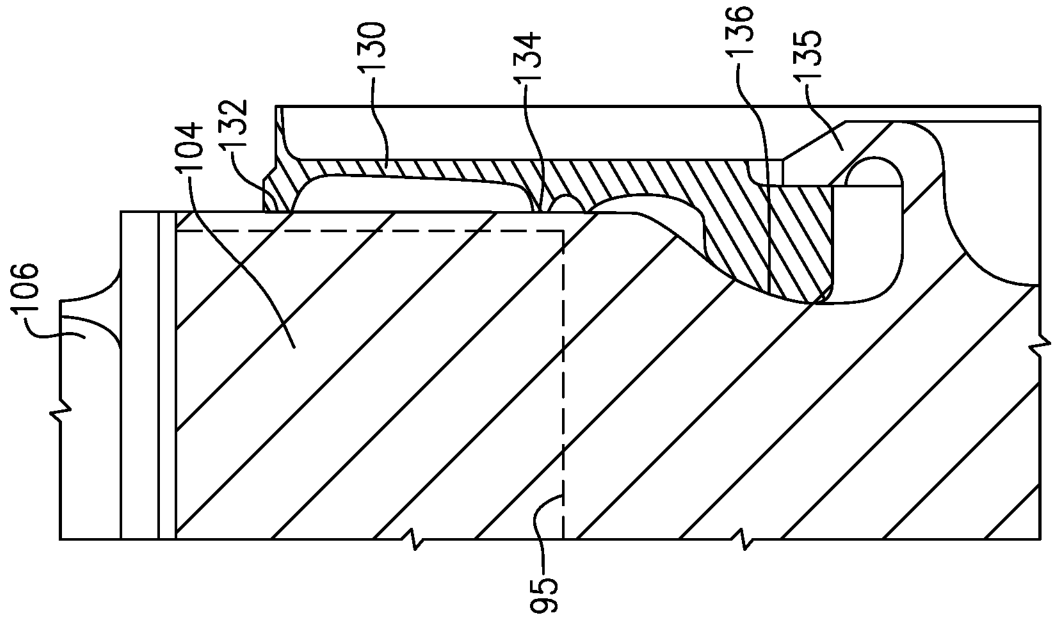
FIG. 3B shows a cross-sectional view through the FIG. 3A.
Figure 3A:
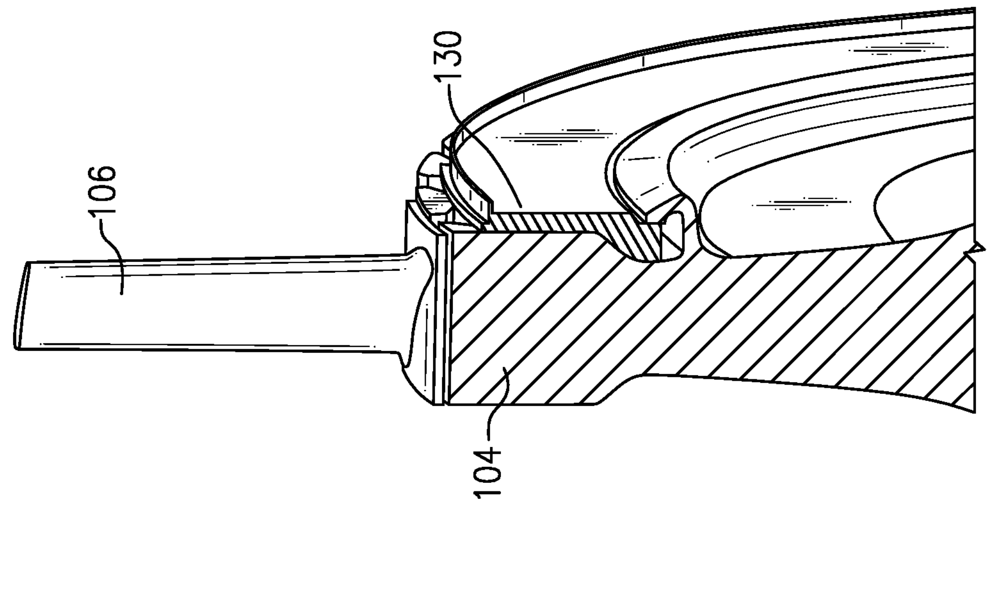
FIG. 3A shows a first mount structure.

FIG. 3A shows another feature including a cover plate 130 that extends circumferentially about a rotational axis of the disk, and assists in securing the blades 106 within the groove 118.

FIG. 3B shows that the cover plate 130 has areas of contact 132 and 134 with the mount portion 95 of the blades 106. Note the blade 106 is not shown in this Figure at the contact point, but there will be contact with the blade spaced into the plane of this Figure is shown in phantom at 95. The cover plate 130 is typically formed of metal.

The cover plate 130 is shown secured to the disk 104 with an ear 135.

Figure 4:
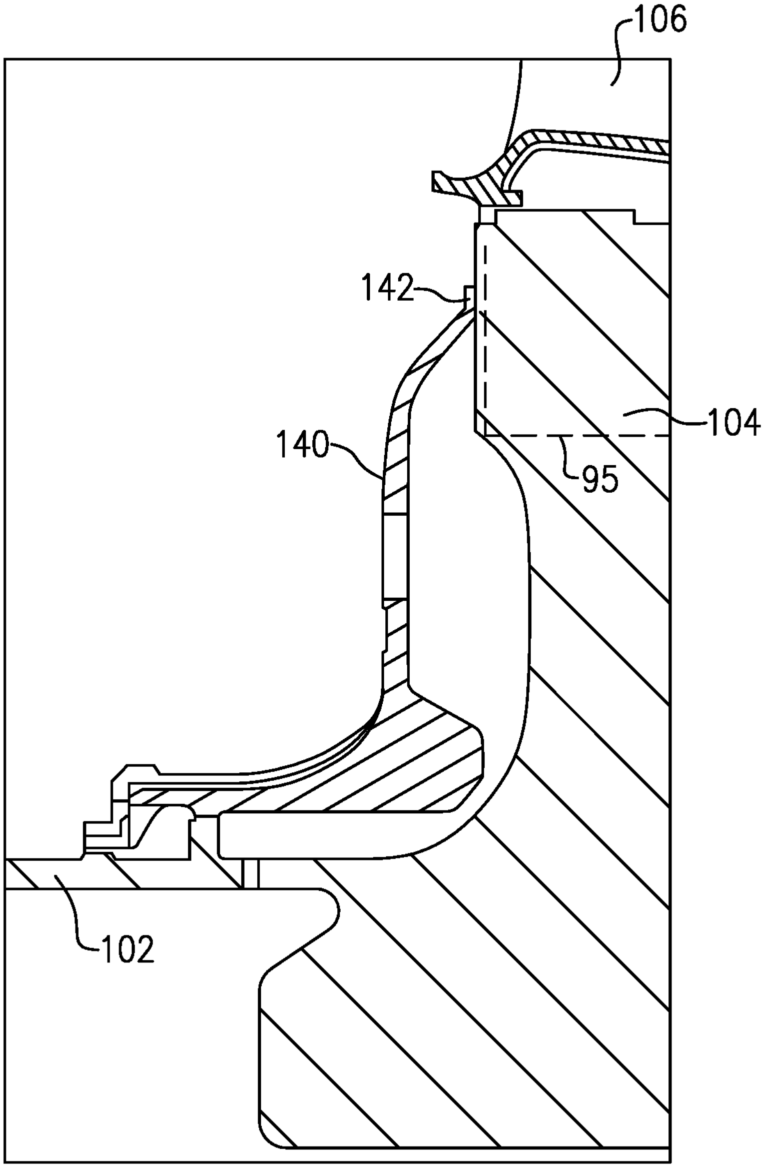
FIG. 4 shows a second turbine blade mount structure.

FIG. 4 shows a second holding structure 140 which is typically known as a "mini-disk." The mini-disk 140 rotates with the shaft 102 and has a contact area 142 that will be in contact with the mount structure 95 of the blades 106/150. Note the blade 106 is not shown in this Figure at the contact point, but there will be contact with the blade spaced into the plane of this Figure is shown in phantom at 95. The mini-disk is also typically formed of metal.

Figure 5C:
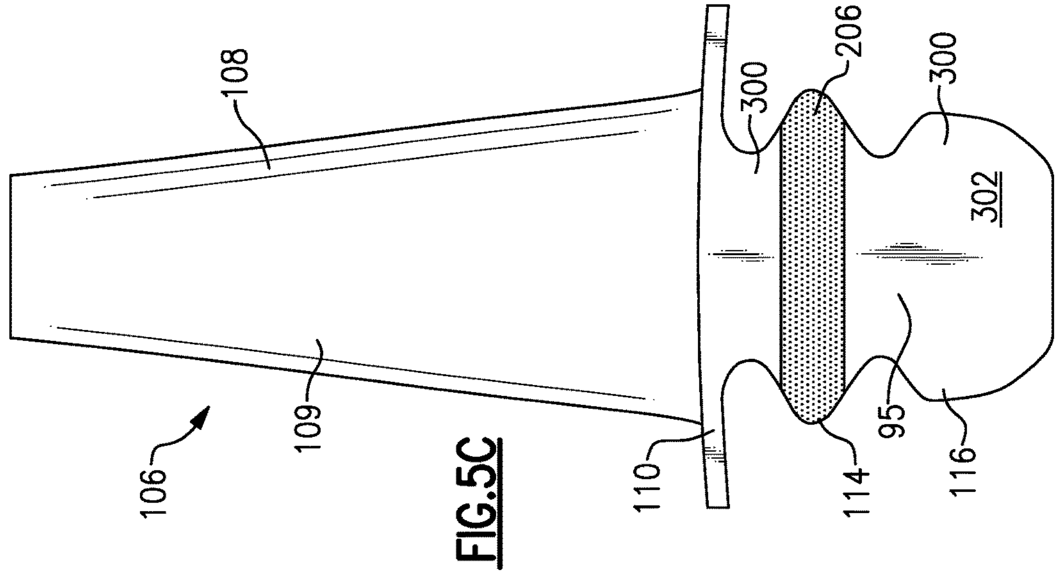
FIG. 5C shows an opposed end of the turbine blade shown in FIG. 5A.
Figure 5B:
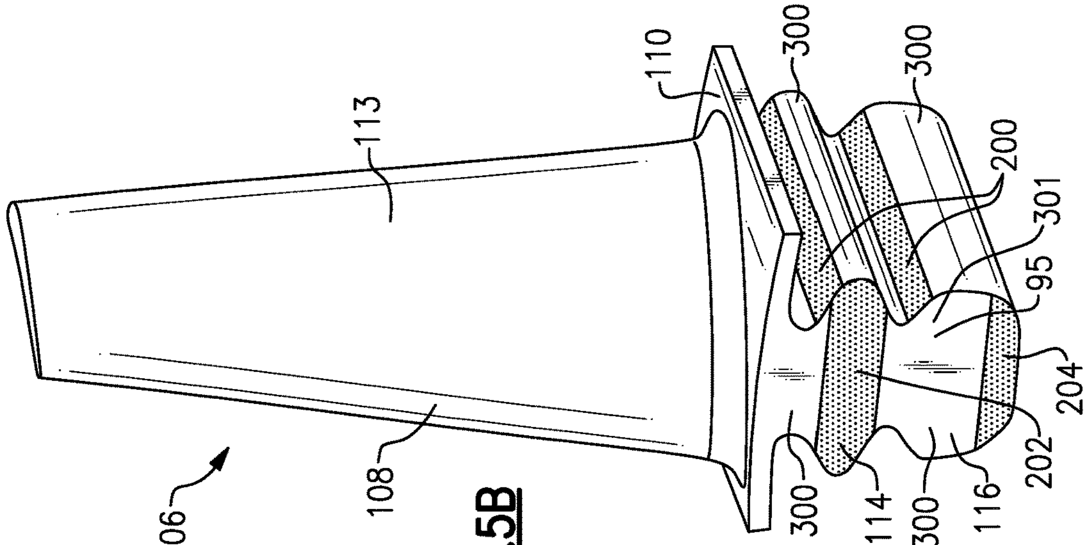
FIG. 5B shows the opposed side of the turbine blade of FIG. 5A.
Figure 5A:
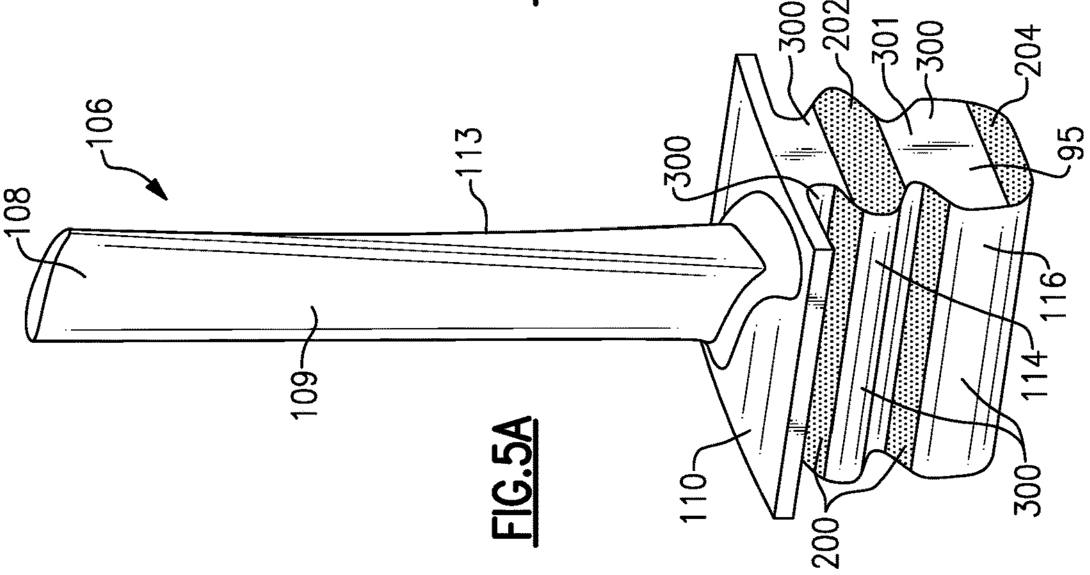
FIG. 5A shows one side of a turbine blade.

Thus, as shown in FIG. 5A, the blade 106 has its mount structure 95 provided with protective coatings at areas that will be in contact with a metal or other generally incompatible material. Thus, coating 200 is applied on radially outer surfaces of the enlarged mount portions 114 and 116 that will contact the disk. Blade 106 has a pressure side 109 and a suction side 115.

Also coating portions 202 and 204 are formed on one end wall 301 of the enlarged mount portions 114 and 116 at the locations 132 and 134 that will be in contact with the cover plate 130.

FIG. 5B shows the opposed side of the blade 106, and again shows coatings 200 on the radially outer surface of the enlarged mount portions 114 and 116. That is, coating 200 is provided on both a pressure side and a suction side of the mount portions.

FIG. 5C shows an opposed end 302 of the blade 106, and shows a coating 206 on the enlarged mount portion 114 at the location 142 that will be in contact with the mini-disk.

The machinable coatings provide an interface protecting the components formed of CMC and metal from wear due to vibrate and further protect against undesired chemical reaction or heat transfer as described above.

The machinable coating also provides a more controlled interface in terms of surface roughness and manufacturing tolerances to enhance sealing effectiveness and load transfer between the components.

The machinable coating also provides a layer between the interfacing components that is more compliant than the bare CMC, which can enable fir-tree designs since the typical lack of deflection inherent of the CMC teeth relative to metallic ones can be compensated for by the more compliant coating layer.

As shown in FIGS. 5A-5C, in combination, there is thus coating on a radially outer face of the circumferentially enlarged mount portions 114 and 116, and on both axial ends 301 and 302 of the mount portions.

There are also portions 300 without the coating radially inward and radially outward of each of the coating portions 200 on the radially outer faces of the enlarged mount portions 114 and 116. Further, there are uncoated portions 300 radially inward and radially outward of the coating portions 202/204/206 on each of the axial ends.

The coating may include rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof. In a particular example, the coating includes at least one of hafnon, zircon, and mullite. Silicon bond coatings and/or mullite top coatings may be most effective.

A gas turbine engine turbine blade under this disclosure could be said to include a turbine blade body including an inner platform. An airfoil extends radially outwardly of the inner platform. The airfoil has a leading edge and a trailing edge, and a suction wall and a pressure wall. The turbine blade has mount structure including at least one circumferentially outwardly extending mount portion on a suction wall side and a pressure wall side each having a radially outer face. The turbine blade body is formed of one of a polymer, metal or ceramic matrix composite. There is a protective coating on the radially outer faces of the at least one enlarged mount portions.

A gas turbine engine turbine blade under this disclosure also could be said to include a turbine blade body including an inner platform. An airfoil extends radially outward of the inner platform. The airfoil has a leading edge and a trailing edge, and a suction wall and a pressure wall. The turbine blade body has mount structure including at least one circumferentially outwardly extending mount portion on a suction wall side and a pressure wall side. Each have a radially outer face and a pair of opposed axial ends. The turbine blade body is formed of one of a polymer, metal or ceramic matrix composite. There is a protective coating on the at least one mount portion at at least one of the axial ends.

Although embodiments have been disclosed, a worker of ordinary skill in this art would recognize that modifications would come within the scope of this disclosure. For that reason, the following claims should be studied to determine the true scope and content of this disclosure.

What is claimed is:

1. A gas turbine engine turbine blade comprising:

a turbine blade body including an inner platform, an airfoil extending radially outwardly of the inner platform, the airfoil having a leading edge and a trailing edge, and a suction wall and a pressure wall;

said turbine blade body having mount structure including at least one circumferentially outwardly extending mount portion on a suction wall side and a pressure wall side each having a radially outer face;

said turbine blade body being formed of one of a polymer matrix composite, metal matrix composite or ceramic matrix composite, and there being a protective coating on the radially outer faces of said at least one enlarged mount portions;

there being uncoated portions radially inward and radially outward of the protective coating on the radially outer faces of said at least one mount portion; and wherein one of two axial ends of said at least one circumferentially extending mount portion also receives the protective coating.

2. The blade as set forth in claim 1, wherein there are two radially spaced ones of said circumferentially extending mount portion of each of said suction wall side and said pressure wall side, and each of said circumferentially extending mount portions having the coating on said radially outer face.

3. The blade as set forth in claim 2, wherein the protective coating is on said one axial end of both of said circumferentially extending mount portions.

4. The blade as set forth in claim 3, wherein the coating is also on an opposed one of said axial ends of at least one of the circumferentially extending mount portions.

5. The blade as set forth in claim 1, wherein the coating is also on an opposed one of said axial ends of at least one of the circumferentially extending mount portion.

6. The blade as set forth in claim 1, wherein there are uncoated portions radially inward and radially outward of the protective coating on said at least one of the axial ends.

7. A gas turbine engine comprising:

a compressor section, a combustor section and a turbine section;

said turbine section including a shaft rotating with a turbine disk, said turbine disk having a plurality of slots and said turbine disk formed of a metal, turbine blades received within each of said slots;

said turbine blades including an inner platform, an airfoil extending radially outwardly of the inner platform, the airfoil having a leading edge and a trailing edge, and a suction wall side and a pressure wall side, and mount structure including at least one circumferentially outwardly extending mount portions each having a radially outer face;

each of said turbine blades being formed of one of a polymer matrix composite, metal matrix composite or ceramic matrix composite, and there being a protective coating on the radially outer faces of said at least one circumferentially outwardly extending mount portions;

there being uncoated portions radially inward and radially outward of the protective coating on the radially outer faces of said at least one mount portion; and wherein one of two axial ends of at least one of said circumferentially extending mount portions also receives the protective coating, and a mount features secures the turbine blades in the disk and contacts the circumferentially extending mount portion at a location on the axial end receiving the coating.

8. The gas turbine engine as set forth in claim 7, wherein there are two radially spaced ones of said circumferentially extending mount portions on each of said suction wall side and said pressure wall side, and each of said circumferentially extending mount portions having the coating on said radially outer face.

9. The gas turbine engine as set forth in claim 8, wherein the protective coating is formed on said one axial end of both of two circumferentially extending mount portions, and the mount feature is a cover plate formed of a metal and secured to the disk.

10. The gas turbine engine as set forth in claim 9, wherein the coating is also on an opposed one of said axial ends of at least one of the circumferentially extending mount portions, and there being a mini-disk fixed to said shaft, and in contact with the mount structure on the turbine blades, with said mini-disk formed of a metal and contacting each of the turbine blades at a location on the opposed axial end, and the location receiving the coating.

11. The gas turbine engine as set forth in claim 8, wherein the coating is also on an opposed one of said axial ends of at least one of the circumferentially extending mount portions, and there being a mini-disk fixed to said shaft, and in contact with the mount structure on the turbine blades, with said mini-disk formed of a metal and contacting each of the turbine blades at a location on the opposed axial end, and the location receiving the coating.

12. The gas turbine engine as set forth in claim 7, wherein the coating is also on an opposed one of said axial ends of at least one of the circumferentially extending mount portions, and there being a mini-disk fixed to said shaft, and in contact with the mount structure on the turbine blades, with said mini-disk formed of a metal and contacting each of the turbine blades at a location on the opposed axial end, and the location receiving the coating.

13. A gas turbine engine turbine blade comprising:

a turbine blade body including an inner platform, an airfoil extending radially outward of the inner platform, the airfoil having a leading edge and a trailing edge, and a suction wall and a pressure wall;

said turbine blade body having mount structure including at least one circumferentially outwardly extending mount portion on a suction wall side and a pressure wall side, and each having a radially outer face and a pair of opposed axial ends; and said turbine blade body being formed of one of a polymer matrix composite, metal matrix composite or ceramic matrix composite, and there being a protective coating on the at least one mount portion at at least one of the axial ends; and there being uncoated portions on said at least one circumferentially outwardly extending mount portion at the at least one axial end radially inward and radially outward of the protective coating.

14. The gas turbine engine blade as set forth in claim 13, wherein the coating is also on an opposed one of said axial ends of at least one of said circumferentially extending mount portion.

15. The gas turbine engine blade as set forth in claim 14, wherein there are uncoated portions radially inward and radially outward of the protective coating on each of said axial ends.

16. The gas turbine engine blade as set forth in claim 13, wherein there are uncoated portions radially inward and radially outward of the protective coating on at least one of said axial ends.

* * * * *